US 6,751,199 B1

(12) United States Patent
Sindhushayana et al.

(10) Patent No.: US 6,751,199 B1
(45) Date of Patent: Jun. 15, 2004

(54) METHOD AND APPARATUS FOR A RATE CONTROL IN A HIGH DATA RATE COMMUNICATION SYSTEM

(75) Inventors: Nagabhushana T. Sindhushayana, San Diego, CA (US); Rashid A. Attar, San Diego, CA (US); Eduardo A. S. Esteves, S.D., CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/556,769

(22) Filed: Apr. 24, 2000

(51) Int. Cl.[7] .................... H04L 12/26; H04B 7/216
(52) U.S. Cl. .................... 370/252; 370/342
(58) Field of Search .................... 370/335, 338, 370/342, 468, 235, 230, 249, 255, 252; 455/226.3; 375/227, 221

(56) References Cited

U.S. PATENT DOCUMENTS

| | | | |
|---|---|---|---|
| 4,901,307 A | 2/1990 | Gilhousen et al. | 370/18 |
| 5,101,501 A | 3/1992 | Gilhousen et al. | 455/33 |
| 5,103,459 A | 4/1992 | Gilhousen et al. | 375/1 |
| 5,504,773 A | 4/1996 | Padovani et al. | 375/200 |
| 5,541,955 A * | 7/1996 | Jacobsmeyer | 375/222 |
| 5,940,439 A * | 8/1999 | Kleider et al. | 375/225 |
| 6,252,854 B1 * | 6/2001 | Hortensius et al. | 370/252 |
| 6,393,276 B1 * | 5/2002 | Vanghi | 455/422.1 |
| 6,510,148 B1 * | 1/2003 | Honkasalo | 370/342 |
| 6,584,086 B1 * | 6/2003 | Shim et al. | 370/335 |

FOREIGN PATENT DOCUMENTS

EP 0899906 A2 3/1999

\* cited by examiner

*Primary Examiner*—Hassan Kizou
*Assistant Examiner*—Timothy Lee
(74) *Attorney, Agent, or Firm*—Philip Wadsworth; Sandra Godsey; Pavel Kalousek

(57) ABSTRACT

A method and an apparatus for rate control in a high data rate (HDR) communication system are disclosed. An exemplary HDR communication system defines a set of data rates, at which an access point (AP) may send data packets to an access terminal (AT). The data rate is selected to maintain targeted packet error rate (PER). The AT's open loop algorithm measures received signal to interference and noise ratio (SINR) at regular intervals, and uses the information to predict an average SINR over the next packet duration. The AT's closed loop algorithm measures a packet error rate (PER) of the received signal, and uses the PER to calculate a closed loop correction factor. The loop correction factor is added to the SINR value predicted by the open loop, resulting in an adjusted SINR. The AT maintains a look up table, which comprises a set of SINR thresholds that represent a minimum SINR necessary to successfully decode a packet at each data rate. The AT uses the adjusted set of SINR thresholds in the look up table to select the highest data rate, the SINR threshold of which is below the predicted SINR. The AT then requests, over the reverse link, that the AP send the next packet at this data-rate.

22 Claims, 2 Drawing Sheets

METHOD AND APPARATUS FOR A RATE CONTROL IN A HIGH DATA RATE COMMUNICATION SYSTEM

BACKGROUND OF THE INVENTION

I. Field of the Invention

The current invention relates to communication. More particularly, the present invention relates to a novel method and apparatus for adaptive rate selection in a wireless communication system.

II. Description of the Related Art

A modern communications system is required to support a variety of applications. One such communications system is a code division multiple access (CDMA) system that conforms to the "TIA/EIA/IS-95 Mobile Station-Base Station Compatibility Standard for Dual-Mode Wide-Band Spread Spectrum Cellular System," hereinafter referred to as the IS-95 standard. The CDMA system supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

In a CDMA system, communications between users are conducted through one or more base stations. In wireless communication systems, forward link refers to the channel through which signals travel from a base station to a subscriber station, and reverse link refers to channel through which signals travel from a subscriber station to a base station. By transmitting data on a reverse link to a base station, a first user on one subscriber station may communicate with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a wireline telephone through a public switched telephone network (FSTN) coupled to the base station, or a terrestrial Internet through a connection with a serving base station.

Given the growing demand for wireless data applications, the need for very efficient wireless data communication systems has become increasingly significant. The IS-95 standard specifies transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the traffic data or voice data is partitioned into code channel frames that are 20 milliseconds wide with data rates as high as 14.4 Kbps.

In mobile radio communication systems, there are significant differences between the requirements for providing voice and data services (i.e., non-voice services such as Internet or fax transmissions). Unlike data services, voice services require stringent and fixed delays between speech frames. Typically, the overall one-way delay of speech frames used for transmitting voice information must be less than 100 msec. By contrast, transmission delays that occur during data (i.e., non-voice information) services can vary and larger delays then those that can be tolerated for voice services can be utilized.

Another significant difference between voice and data services is that, in contrast to data services, voice services require a fixed and common grade of service. Typically, for digital systems providing voice services, this requirement is met by using a fixed and equal transmission rate for all users and a maximum tolerable error rate for speech frames. For data services, the grade of service can vary from user to user.

Yet another difference between voice services and data services is that voice services require a reliable communication link which, in the case of a CDMA communication system, is provided using a soft handoff. A soft handoff requires the redundant transmission of the same voice information from two or more base stations to improve reliability. A soft handoff method is disclosed in U.S. Pat. No. 5,101,501, entitled "METHOD AND SYSTEM FOR PROVIDING SOFT HANDOFF IN COMMUNICATIONS IN A CDMA CELLULAR TELEPHONE SYSTEM." This additional reliability is not required to support data services, because data packets received in error can be retransmitted.

As a mobile station moves in a mobile radio communication system, the quality of the forward link (and the capacity of the forward link to transmit data) will vary. Thus, at some moments a given forward link between a base station and a mobile station will be able to support a very high data transmission and, at other moments, the same forward link may only be able to support a much reduced data transmission rate. In order to maximize the throughput of information on the forward link, it would be desirable if the transmission of data on the forward link could be varied so as to increase the data rate during those intervals where the forward link can support a higher transmission rate.

When non-voice traffic is being sent from a base station to a mobile station on a forward link, it may be necessary to send control information from the mobile station to the base station. At times, however, even though the forward link signal may be strong, the reverse link signal may be weak, thereby resulting in a situation where the base station cannot receive control information from the mobile station. In such situations, where the forward link and the reverse link are unbalanced, it may be undesirable to increase the transmit power on the reverse link in order to improve the reception quality of the control information at the base station. For example, in CDMA systems, increasing the transmit power on the reverse link would be undesirable, as such a power increase could adversely affect the reverse link capacity seen by other mobile stations in the system. It would be desirable to have a data transmission system where the forward and reverse links associated with each mobile station were maintained in a balanced state without adversely impacting the reverse link capacity. It would be further desirable if such a system could maximize the throughput of non-voice data on individual forward links when such links are sufficiently strong to support higher data rates.

One approach to the aforementioned requirements in high data rate (HDR) systems is to keep the transmit power fixed and vary the data rate depending on the users' channel conditions. Consequently, in a modern HDR system, Access Point(s) (APs) always transmit at maximum power to only one Access Terminal (AT) in each time slot, and the AP uses rate control to adjust the maximum rate that the AT can reliably receive. An AP is a terminal allowing high data rate transmission to ATs.

As used in this document, a time slot is a time interval of finite length, e.g., 1.66 ms. A time slot can contain one or more packets. A packet is a structure, comprising a preamble, a payload, and a quality metric, e.g., a cyclical redundancy check (CRC). The preamble is used by an AT to determine whether a packet has been intended for the AT.

An exemplary HDR system defines a set of data rates, ranging from 38.4 kbps to 2.4 Mbps, at which an AP may send data packets to an AT. The data rate is selected to maintain a targeted packet error rate (PER). The AT measures the received signal to interference and noise ratio (SINR) at regular intervals, and uses the information to predict an average SINR over the next packet duration. An exemplary prediction method is disclosed in application Ser. No. 09/394,980, filed on Sep. 13, 1999, entitled "SYSTEM AND METHOD FOR ACCURATELY PREDICTING SIGNAL TO INTERFERENCE AND NOISE RATIO TO IMPROVE COMMUNICATIONS SYSTEM PERFORMANCE," now U.S. Pat. No. 6,426,971, issued Jul. 30, 2002 to Wu et al. assigned to the assignee of the present invention and incorporated herein by reference.

FIG. 1 shows a conventional open loop rate control apparatus 100. A stream of past SINR values at instances [n−m], . . . [n−1], [n], each measured over a duration of a corresponding packet, is provided to a SINR predictor 102. The SINR predictor 102 predicts the average SINR over the next packet duration in accordance with the following equation:

$$OL\_SINR_{Predicted} = OL\_SINR_{Estimated} - K \cdot \sigma_e \quad (1)$$

In Equation (1), $OL\_SINR_{Predicted}$ is a SINR predicted by the open loop for the next packet, $OL_{13} SINR_{Estimated}$ is a SINR estimated by the open loop based on past SINR values, K is a back-off factor, and $\sigma_e$ is a standard deviation of an error metric.

The estimated SINR may be obtained, for example, by selecting an output from a bank of low pass filters acting on past measurements of SINR. Selection of a particular filter from the filter bank may be based on an error metric, defined as a difference between the particular filter output and measured SINR over a packet duration immediately following the output. The predicted SINR is obtained by backing off from the filter output by an amount equal to the product of the back-off factor K and the standard deviation $\sigma_e$ of the error metric. The value of the back-off factor K is determined by a back-off control loop, which ensures that a tail probability, i.e., probability that predicted SINR exceeds the measured SINR, is achieved for a certain percentage of time.

The $SINR_{Predicted}$ value is provided to a look up table 104 that maintains a set of SINR thresholds that represent the minimum SINR required to successfully decode a packet at each data rate. An AT (not shown) uses the look up table 104 to select the highest data rate whose SINR threshold is below the predicted SINR, and requests that an AP (not shown) send the next packet at this data rate.

The aforementioned method is an example of an open loop rate control method that determines the best rate at which to receive the next packet, based only on the measurement of the channel SINR, without any information about the decoder error rate (for packets of each data rate) at a given SINR under the prevailing channel conditions.

Any open loop rate control algorithm suffers from several shortcomings, some of which are discussed below. First, a certain tail probability, e.g., 2%, does not imply a PER of 2%. This is because PER is a monotonically decreasing function of SINR, with a finite slope that depends on the coding scheme and channel conditions. However, Equation (1) assumes "brick wall" PER characteristics, i.e., a packet is guaranteed to be decoded whenever the SINR exceeds the threshold for the corresponding rate, and a packet is in error whenever the SINR falls below the threshold. Furthermore, the open loop rate control method uses a fixed set of SINR thresholds, which ensures packet error rates close to the target error rate under worst-case channel conditions. However, the performance of the decoder depends not only on the SINR, but also on channel conditions. In other words, a method that uses a fixed set of SINR thresholds for all channels achieves different packet error rates on different channels. Consequently, while the open loop method works optimally under the worst-case channel conditions, it is possible that under typical channel conditions, the method results in much lower error rates than is necessary, at the expense of diminished throughput. Additionally, a practical rate control method necessitates a small, finite set of data rates. The rate selection method always selects the nearest lower data rate in order to guarantee an acceptable PER. Thus, rate quantization results in loss of system throughput.

Therefore, there exists a need to address deficiencies of the existing method.

SUMMARY OF THE INVENTION

The present invention is directed to a novel method and apparatus for adaptive rate selection in a wireless communication system. Accordingly, in one aspect of the invention, SINR predicted by an open loop method is modified by a closed loop correction. The closed loop correction is updated in accordance with packet error events and a target error rate.

In another aspect of the invention, the closed loop correction is advantageously updated in accordance with a frequency with which packets are received.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
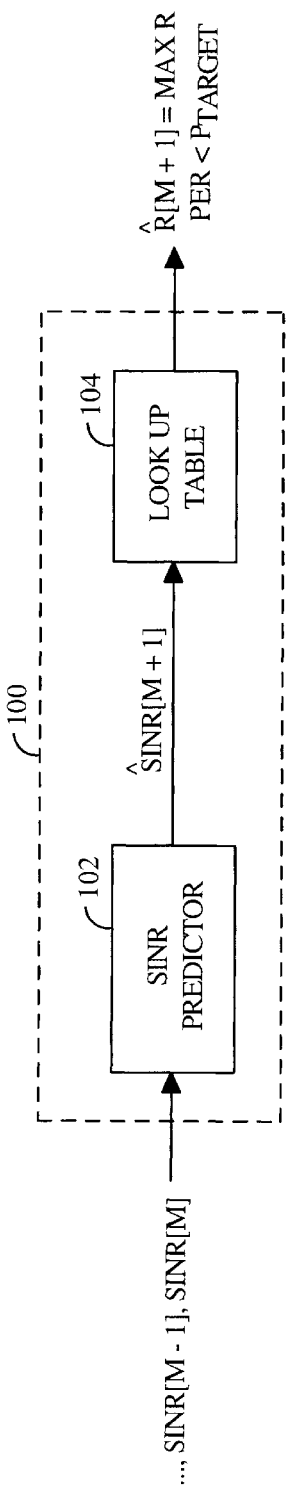
FIG. 1 illustrates a block diagram of a conventional, open loop rate control apparatus.
Figure 2:
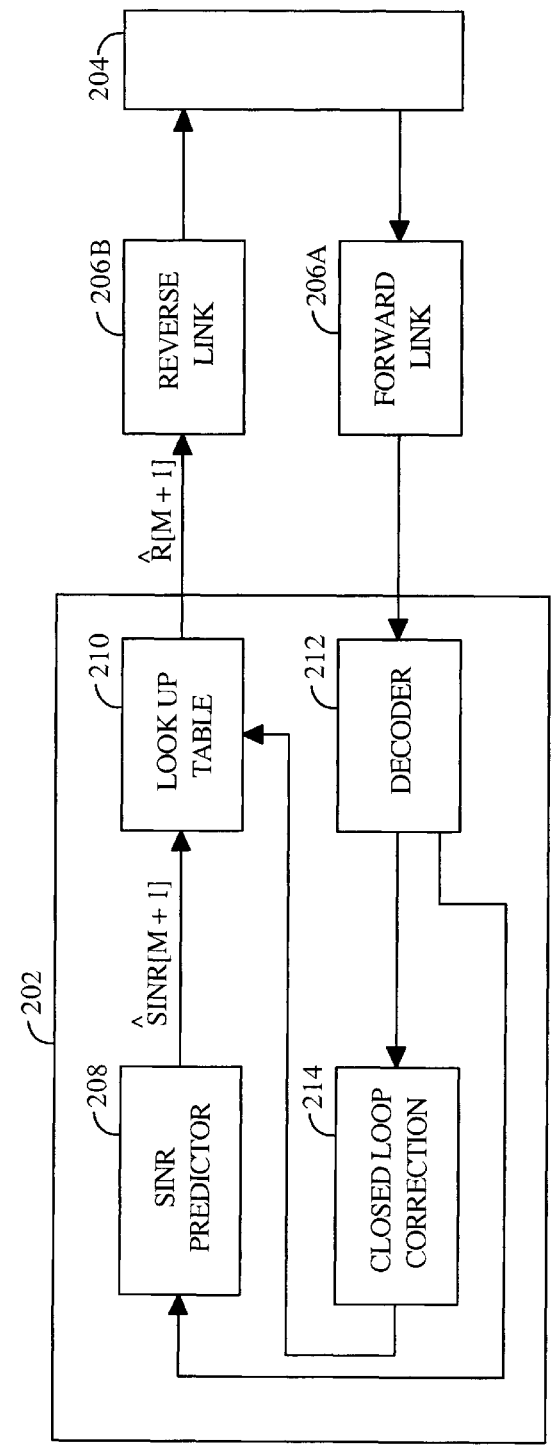
FIG. 2 illustrates a block diagram of an apparatus for a rate control method in accordance with one embodiment of the invention.

FIG. 2 illustrates an exemplary communication system 200 capable of implementing embodiments of the invention. An AP 204 transmits signals to an AT 202 over a forward link 206a, and receives signals from the AT 202 over a reverse link 206b. The communication system 200 can be operated bi-directionally, each of the terminals 202, 204 operating as a transmitter unit or a receiver unit, or both concurrently, depending on whether data is being transmitted from, or received at, the respective terminal 202, 204. In a cellular wireless communication system embodiment, the transmitting terminal 204 can be a base station (BS), the receiving terminal 202 can be a mobile station (MS), and the forward link 206a and reverse link 206b can be electromagnetic spectra.

The AT 202 contains an apparatus for a rate control method in accordance with one embodiment of the present invention. The apparatus contains two control loops, an open loop and a closed loop.

The open loop, comprising a SINR predictor 208 and a look up table 210, controls the forward-link data rate based on the difference between the average SINR of the next packet and SINR thresholds of all the data rates. A signal arriving at the AT 202 from the AP 204 over the forward link 206a in packets is provided to a decoder 212. The decoder 212 measures an average SINR over the duration of each packet, and provides the SINRs to the SINR predictor 208. In one embodiment, the SINR predictor 208 predicts a SINR ($OL\_SNIR_{Predicted}$) value of the next packet in accordance with Equation (1). However, one skilled in the art will understand that any open loop method, not limited to the one expressed by Equation (1), may be used. The $OL\_SNIR_{Predicted}$ value is provided to the look up table 210. The look up table 210 maintains a set of SINR thresholds that represents the minimum SINR required to successfully decode a packet at each data rate. The set of SINR thresholds is adjusted by the operation of the closed loop.

The closed loop utilizes PER information provided by the decoder 212 to determine a closed loop correction value L in block 214. The closed loop correction value L adjusts the set of SINR thresholds in the look up table 204 in accordance with the following equation:

$$CL\_SINR_{Predicted} = OL\_SINR_{Predicted} + L, \quad (2)$$

In equation (2), L represents the closed loop correction to the open loop prediction of SINR over the next packet duration. Adding L to the SINR predicted by the open loop algorithm in Equation (1) is equivalent to subtracting L from the SINR thresholds used for rate control. Because the correction term L is updated in accordance with PER information, which reflects the prevailing channel conditions, the set of SINR thresholds is better matched to the prevailing channel conditions.

The AT 202 uses the adjusted set of SINR thresholds in the look up table 210 to select the highest data rate, the SINR threshold of which is below the predicted SINR. The AT 202 then requests, over the reverse link 206b, that the AP 204 sends the next packet at this data-rate.

Although the SINR predictor 208, the decoder 212, and the closed loop correction block 214 are shown as separate elements, one skilled in the art will appreciate that the physical distinction is made for explanatory purposes only. The predictor SINR 208, the decoder 212, and the closed loop correction block 214 may be incorporated into a single processor accomplishing the above-mentioned processing. Thus, the processor may be, e.g., a general-purpose processor, a digital signal processor, a programmable logic array, and the like. Furthermore, the look up table 210 is a space in a memory. The memory may be a part of the above-mentioned processor or processors, or be a separate element. The implementation of the memory is a design choice. Thus, the memory can be any media capable of storing information, e.g., a magnetic disk, a semiconductor integrated circuit, and the like.

Figure 3:
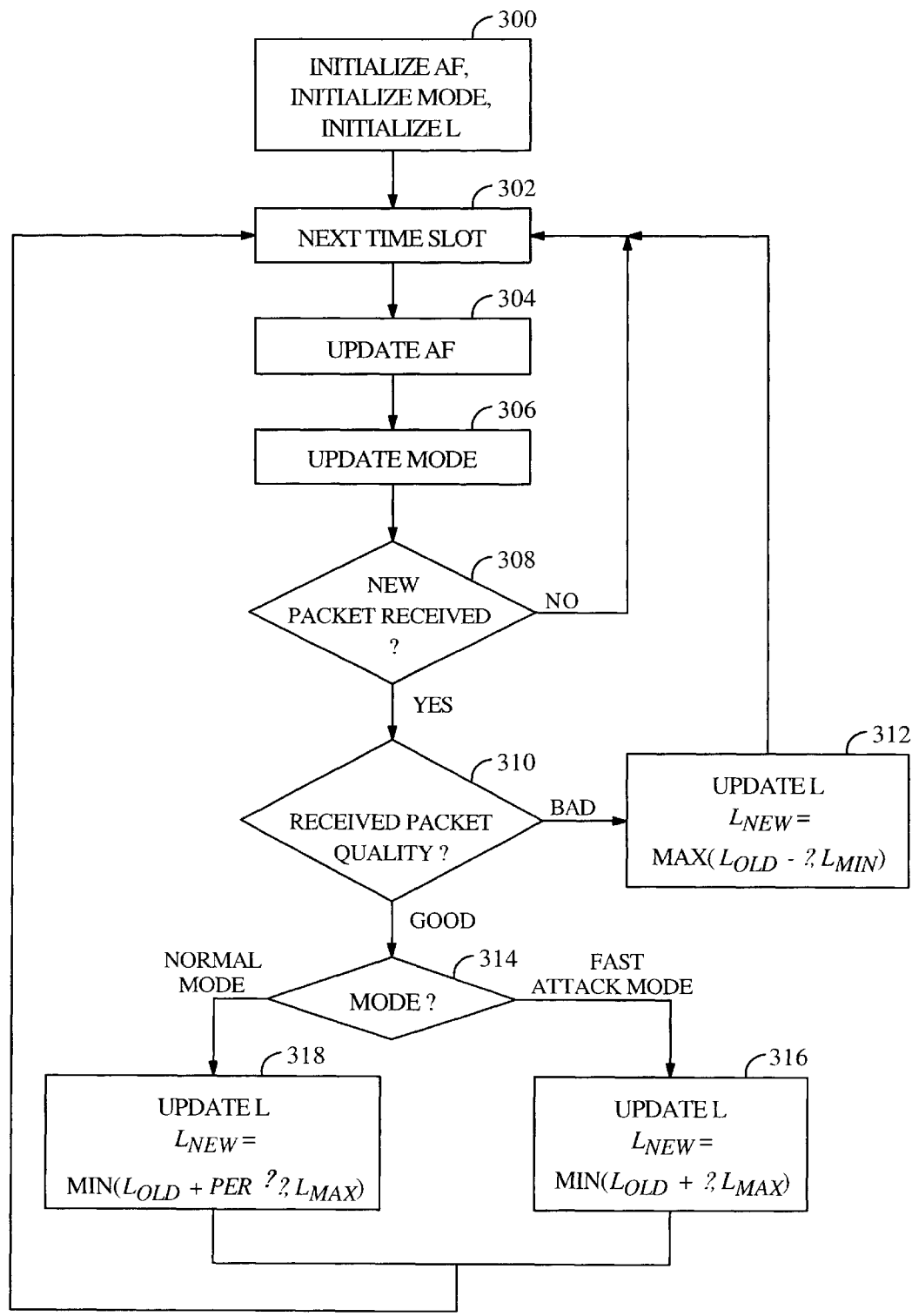
FIG. 3 illustrates a flowchart of an exemplary method of updating an outer loop correction.

FIG. 3 illustrates a flowchart of an exemplary method of updating L to ensure the best possible throughput with acceptable error rates.

In step 300, a normalized activity factor (AF) variable is initialized by an AT (not shown) to a value of zero or one. The AF quantifies a time fraction for which the AT receives packets on the forward link. An AF being equal to one implies that the AT 202 is receiving packets most of the time, whereas an AF being equal to zero implies that the forward link to the given AT is mostly idle. In one embodiment, the AF is initialized at the instant when the AT initiates a new communication. In that case, it may be advantageous to initialize the AF to one because the AT is receiving packets. The AF is updated at the end of each time slot according to the following equations:

$$AF_{New} = (1-f) \cdot AF_{Old} + f \quad (3)$$

or $$AF_{New} = (1-f) \cdot AF_{Old}, \quad (4)$$

where:

$f \in (0,1)$ is a parameter controlling a rate of change of the AF. In one embodiment of the inventions, f is set to 1/50.

Equation (3) is used when the AT finds a packet preamble at the beginning of a time slot, or is still demodulating a packet whose preamble was detected in an earlier time slot. This happens when the AT sends a request for data, and an AP (not shown) sends the requested data. Equation (4) is used when the AT is not in the middle of packet demodulation, searches for a packet preamble, and fails to find the preamble. This happens when the AT sends a request for data, and the AP fails to receive or ignores the request for data, and decides to serve some other AT in the system.

In step 300, the outer loop correction variable L is also initialized by the AT. L can be initialized to any value between $L_{min}$ and $L_{max}$. $L_{min}$, $L_{max}$ may attain any value. Exemplary values are cited below. In one embodiment, L is initialized to 0 dB.

In step 300, a mode of operation is also initialized. There are two modes: a normal mode and a fast attack mode. The motivation behind defining the two modes for the rate control algorithm is based on the knowledge that an optimal step size for upward and downward corrections of L depends on a target PER, the packet arrival process, and preamble false alarm statistics. While the preamble false alarm statistics are relatively constant and correlated with the outer loop term L, the packet arrival process is time varying and unknown apriori at the AT. As discussed above, data traffic tends to be bursty, with an idle state characterized by infrequent packet arrival, and busy, with frequent packet arrival. Consequently, the normal mode is used during steady state. Fast attack mode designed to recover quickly from long periods of inactivity is used when preamble false alarms tend to drive the rate control algorithm toward the conservative regime.

The rules for determining the mode of the algorithm, as well as the rules for updating L, are based on the detection of good or bad packets. The access terminal is said to receive a good packet if it detects the packet preamble, demodulates and decodes the packet, and recovers a valid CRC. The access terminal is said to receive a bad packet if it detects a packet preamble, but upon demodulating and decoding the packet, it obtains an invalid CRC.

The transition to the fast attack mode occurs if all the following conditions are satisfied:

$$L < L_{AMThreshold}, \quad (5)$$

$$AF < AF_{Idle}, \text{ and} \quad (6)$$

the two most recently received packets are good.

In Equations (5)–(6), $L_{AMThreshold}$ is a threshold controlling the transition to the fast attack mode with respect to L. In one embodiment of the invention, the $L_{AMThreshold}$ threshold is set to 0 dB. $AF_{Idle}$ is a threshold controlling the transition to the fast attack mode with respect to AF. In one embodiment of the invention, the $AF_{Idle}$ threshold is set to 10%.

The transition to the normal mode occurs if any of the following conditions are satisfied:

$$L \geq L_{AMThreshold}, \quad (7)$$

$$AF \geq AF_{Busy}, \text{ or} \quad (8)$$

the most recently received packet is bad.

In Equations (7)–(8), $L_{NMThreshold}$ is a threshold controlling the transition to the normal mode with respect to L. In one embodiment of the invention, the $L_{AMThreshold}$ threshold is set to 2 dB. $AF_{Busy}$ is a threshold controlling the transition to the normal mode with respect to A. In one embodiment of the invention, the $AF_{Busy}$ threshold is set to 25%.

Upon finishing initialization, the AT waits for a new time slot. Once a time slot is detected in step 302, the AF is updated in step 304 using Equations (3) or (4), and the mode is updated in step 306 using Equations (5)–(6) or (7)–(8).

In step 308, a test is made whether the slot belonged to a new packet. If a new packet has not been detected, the method returns to step 302. If a new packet has been detected, the packet is tested in step 310, and if a bad packet has been detected, the method continues in step 312. In step 312, the value of L is updated in accordance with the following equation:

$$L_{new} = \max(L_{Old} - \delta, L_{min}), \quad (9)$$

where $\delta$ is a step size. In one embodiment of the invention, the step size is set to 0.25 dB. $L_{min}$ is the minimum value that L can attain. In one embodiment of the invention, the value of $L_{min}$ is limited to −1 dB. The method then returns to step 302.

If, in step 310, a good packet was detected, the method continues in step 314. In step 314, the mode is tested. If the AT is in fast attack mode, the value of L is updated in accordance with the following equation in step 316:

$$L_{New} = \min(L_{Old} + \delta, L_{max}) \quad (9)$$

where:

$\delta$ is a step size. In one embodiment of the invention, the step size is set to 0.25 dB. $L_{max}$ is the maximum value that L can attain. In one embodiment of the invention, the value of $L_{max}$ is limited to 3 dB. Once L is updated in step 318 the method returns to step 302.

If a normal mode was detected in step 314, the method continues in step 318, where the value of L is updated in accordance with the following equation:

$$L_{new} = \min(L_{old} + \text{TARGET\_PER} \cdot \delta, L_{max}). \quad (10)$$

In Equation (9), $\delta$ is a step size. In one embodiment of the invention, the step size is set to 0.25 dB. TARGET_PER is the PER to be maintained. $L_{max}$ is the maximum value that L can attain. In one embodiment of the invention, the value of $L_{max}$ is limited to 3 dB. Once L is updated in step 318 the method returns to step 302.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for rate selection in a wireless communication system, comprising the steps of:

determining an open loop prediction of signal to noise and interference ratio;

determining a closed loop correction, comprising the steps of:
   determining a quality of a received packet; and
   decreasing said closed loop correction if said quality is bad; and selecting a data rate in accordance with said open loop prediction and said closed loop correction, and wherein said step of decreasing is carried out in accordance with an equation:

$$L_{new} = \max(L_{old} - \delta, L_{min}),$$

wherein $L_{new}$ is an updated value of said outer loop correction, $L_{old}$ is a previous value of said outer loop correction, $\delta$ is a step size, and $L_{min}$ is the minimum value that said outer loop correction can attain.

2. The method of claim 1, wherein said step of determining a closed loop correction comprises the steps of:

determining a quality of a received packet; and increasing said closed loop correction if said quality is good.

3. The method of claim 2, wherein said step of increasing comprises the steps of:

determining a mode of operation; and increasing said closed loop correction in accordance with said mode of operation.

4. A method of claim 3 for rate selection in a wireless communication system, comprising the steps of:

determining an open loop prediction of signal to noise and interference ratio;

determining a closed loop correction, comprising the steps of:
   determining a quality of a received packet; and
   increasing said closed loop correction if said quality is good, comprising the steps of:
   determining a mode of operation, comprising the steps of:
   determining a time fraction for which a packet is received; and
   selecting said mode of operation in accordance with said time fraction; and
   increasing said closed loop correction in accordance with said mode of operation; and selecting a data rate in accordance with said open loop prediction and said closed loop correction.

5. The method of claim 4 wherein when a packet is detected said step of determining is carried out in accordance with an equation:

$$AF_{New}=(1-f) \cdot AF_{Old}+f$$

wherein $AF_{new}$ is an updated value of said time fraction, $L_{old}$ is a previous value of said time fraction, and $f \in (0,1)$ is a parameter controlling a rate of change of said time fraction.

6. The method of claim 4 wherein when a packet detection fails said step of determining is carried out in accordance with an equation:

$$AF_{New}=(1-f) \cdot AF_{Old},$$

wherein $AF_{new}$ is an updated value of said time fraction, $L_{old}$ is a previous value of said time fraction, and $f \in (0,1)$ is a parameter controlling a rate of change of said time fraction.

7. The method of claim 4 wherein the step of selecting comprises the step of selecting a fast attack mode if all of the following conditions are satisfied:

$$L < L_{AMThreshold},$$

$$AF < AF_{Idle},$$

the two most recently received packets are good, wherein $L_{AMThreshold}$ is a threshold controlling the transition to said fast attack mode with respect to L and $AF_{Idle}$ is a threshold controlling the transition to said fast attack mode with respect to AF.

8. The method of claim 4 wherein the step of selecting comprises the step of selecting a normal mode if any of the following conditions are satisfied:

$$L \geq L_{NMThreshold},$$

$$AF \geq AF_{Busy}, \text{ or}$$

the most recently received packet is bad, wherein $L_{NMthreshol}$ is a threshold controlling the transition to said normal mode with respect to L and $AF_{Idle}$ is a threshold controlling the transition to said normal mode with respect to AF.

9. The method of claim 3 wherein when in a fast attack mode of operation said step of increasing is carried out in accordance with an equation:

$$L_{new}=\min(L_{old}+\delta', L_{max}),$$

wherein $L_{new}$ is an updated value of said outer loop correction, $L_{old}$ is a previous value of said outer loop correction, $\delta'$ is a step size, and $L_{max}$ is the maximum value that said outer loop correction can attain.

10. The method of claim 3 wherein when in a normal mode of operation said step of increasing is carried out in accordance with an equation:

$$L_{new}=\min(L_{old}+\text{TARGET\_PER} \cdot \delta, L_{max}),$$

wherein $L_{new}$ is an updated value of said outer loop correction, $L_{old}$ is a previous value of said outer loop correction, TARGET_PER is a packet error rate to be attained, $\delta'$ is a step size, and $L_{max}$ is the maximum value that said outer loop correction can attain.

11. A method for rate selection in a wireless communication system, comprising the steps of:
   determining an open loop prediction of signal to noise and interference ratio;
   determining a closed loop correction; and
   selecting a data rate in accordance with said open loop prediction and said closed loop correction, comprising the steps of:
      summing said open loop prediction of signal to noise and interference ratio and said closed loop correction; and
      determining said data rate as the highest data rate, a signal to noise ratio of which is below said summed signal to noise ratio.

12. An apparatus for selecting rate in a wireless communication system, comprising:
   a processor; and
   a storage medium coupled to the processor and containing a set of instructions executable by the processor to:
      determine an open loop prediction of signal to noise and interference ratio;
      determine a closed loop correction; and
      select a data rate in accordance with said open loop prediction and said closed loop correction,
   wherein said processor is configured to decrease said closed loop correction if a quality of a received packet is bad, and
   wherein said processor is configured to decrease said closed loop correction in accordance with an equation:

$$L_{new}=\max(L_{old}-\delta, L_{min}),$$

wherein $L_{new}$ is an updated value of said outer loop correction, $L_{old}$ is a previous value of said outer loop correction, $\delta$ is a step size, and $L_{min}$ is the minimum value that said outer loop correction can attain.

13. The apparatus of claim 12, wherein said processor is configured to increase said closed loop correction if a quality of a received packet is good.

14. An apparatus for selecting rate in a wireless communication system, comprising:
   a processor; and
   a storage medium coupled to the processor and containing a set of instructions executable by the processor to:
      determine an open loop prediction of signal to noise and interference ratio;
      determine a closed loop correction; and
      select a data rate in accordance with said open loop prediction and said closed loop correction,
   wherein said processor is configured to increase said closed loop correction if a quality of a received packet is good, and
   wherein said processor is configured to:
      determine a mode of operation; and
      increase said closed loop correction in accordance with said mode of operation.

15. The apparatus of claim 14 wherein said processor is configured to:
   determine a time fraction for which a packet is received; and
   select said mode of operation in accordance with said time fraction.

16. The apparatus of claim 15, wherein when a packet is detected said processor is configured to determine said time fraction in accordance with an equation:

$$AF_{New}=(1-f) \cdot AF_{Old}+f$$

wherein $AF_{new}$ is an updated value of said time fraction, $L_{old}$ is a previous value of said time fraction, and $f \in (0,1)$ is a parameter controlling a rate of change of said time fraction.

17. The apparatus of claim 15 wherein when a packet detection fails said processor is configured to determine said time fraction in accordance with an equation:

$$AF_{New}=(1-f) \cdot AF_{Old},$$

wherein $AF_{new}$ is an updated value of said time fraction, $L_{old}$ is a previous value of said time fraction, and $f \in (0,1)$ is a parameter controlling a rate of change of said time fraction.

18. The apparatus of claim 15 wherein said processor is configured to select a fast attack mode if all of the following conditions are satisfied:

$$L < L_{AMThreshold},$$

$$AF < AF_{Idle},$$

the two most recently received packets are good, wherein $L_{AMThreshold}$ is a threshold controlling the transition to said fast attack mode with respect to L and $AF_{Idle}$ is a threshold controlling the transition to said fast attack mode with respect to AF.

19. The apparatus of claim 15 wherein said processor is configured to select a normal mode if any of said conditions are satisfied:

$$L \geq L_{NMThreshold},$$

$$AF \geq AF_{Busy}, \text{ or}$$

the most recently received packet is bad, wherein $L_{NMhreshold}$ is a threshold controlling the transition to said normal mode with respect to L and $AF_{Idle}$ is a threshold controlling the transition to said normal mode with respect to AF.

20. The apparatus of claim 14 wherein when in a fast attack mode of operation said processor is configured to increase said closed loop correction in accordance with an equation:

$$L_{new}=\min(L_{old}+\delta',L_{max}),$$

wherein $L_{new}$ is an updated value of said outer loop correction, $L_{old}$ is a previous value of said outer loop correction, $\delta'$ is a step size, and $L_{max}$ is the maximum value that said outer loop correction can attain.

21. The apparatus of claim 14 wherein when in a normal mode of operation said processor is configured to increase said closed loop correction in accordance with an equation:

$$L_{new}=\min(L_{old}+\text{TARGET\_PER} \cdot \delta, L_{max}),$$

wherein $L_{new}$ is an updated value of said outer loop correction, $L_{old}$ is a previous value of said outer loop correction, TARGET_PER is a packet error rate to be attained, $\delta'$ is a step size, and $L_{max}$ is the maximum value that said outer loop correction can attain.

22. An apparatus for selecting rate in a wireless communication system, comprising:

a processor; and a storage medium coupled to the processor and containing a set of instructions executable by the processor to:
determine an open loop prediction of signal to noise and interference ratio;
determine a closed loop correction; and
select a data rate in accordance with said open loop prediction and said closed loop correction, wherein the processor is configured to:
sum said open loop prediction of signal to noise and interference ratio and said closed loop correction; and
determine said data rate as the highest data rate, a signal to noise ratio of which is below said modified signal to noise ratio.

* * * * *